Aug. 26, 1958
F. X. BRUCKER
2,849,322
WRAPPED HAM
Filed June 27, 1955
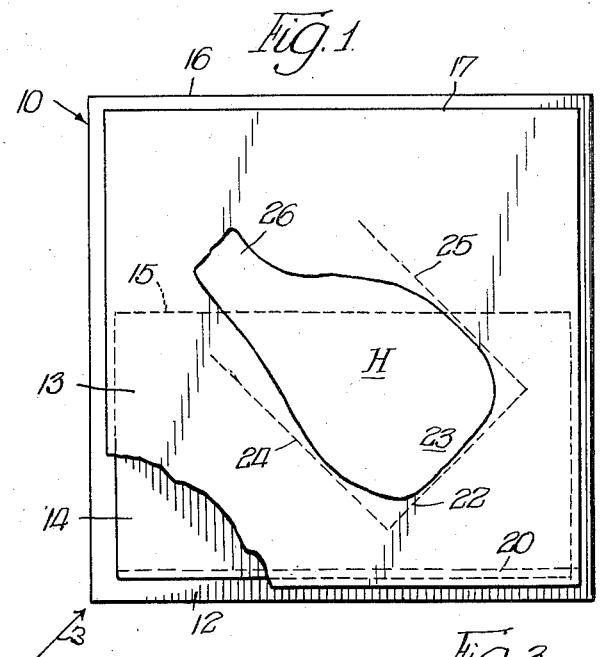
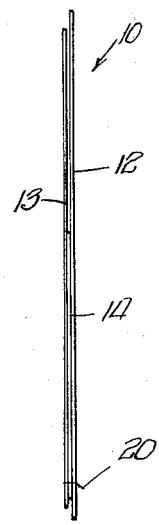
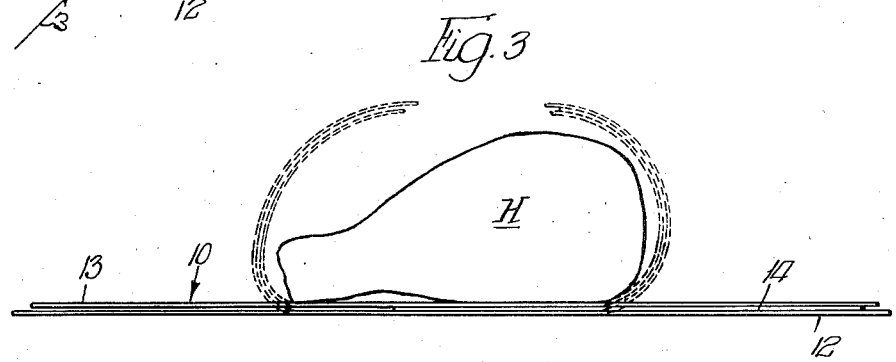
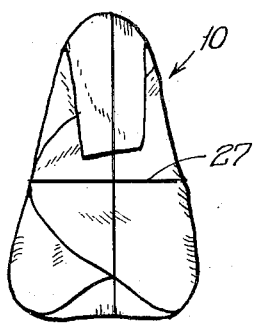
INVENTOR.
Francis X. Brucker,
BY
W. Bartlett Jones,
Atty.

United States Patent Office 2,849,322
Patented Aug. 26, 1958

2,849,322

WRAPPED HAM

Francis X. Brucker, Mount Prospect, Ill.

Application June 27, 1955, Serial No. 518,159

21 Claims. (Cl. 99—174)

The present invention relates to a wrapping for meat products, such as ham, bacon and the like.

An important function of meat wrappings is attractively to display the meat. The outer layer of the wrapping is usually provided with merchandising information and designs, such as a picture of the product and other labeling features, and it is important to maintain this outer layer in as neat and presentable a state as possible. Therefore, the better wrappings minimize the transmission of grease through the wrapping. In the case of juicy meats, particularly hams which have been pickled with brine by arterial pumping, the wrapping also should minimize the absorption and transmission of aqueous juices from the ham to the face of the wrapper.

Another requirement for wrapped meats, and especially juicy hams, is the provision for breathing of the wrapped meat, that is, the egress and ingress of gas through folds in the wrapping and the evaporation of water vapor through the wrapping. Since such evaporation leads to undesirable shrinkage, and to a resulting concentration of brine in the case of pickled hams, the taste quality of the ham is changed by loss of water content. When a ham is tightly sealed, as would seem desirable, the aqueous juices normally subject to exudation from the ham form a slime at the surface of the ham, which is not only unattractive, but ultimately leads to spoilage.

The present invention has for its object to overcome the foregoing difficulties and to provide a completely wrapped meat product which permits exterior printing, which minimizes appearance of grease on the exterior, which avoids appearance of wet spots on the exterior of hams displayed for sale, which permits but controls the loss of water content as water vapor, which permits breathing, and which avoids the effect of slime.

It is a particular object of the invention to provide such a wrapper for brine-cured hams.

It is a further object to provide a wrapping consisting of a plurality of layers of sheet material with different properties and with arrangements in the wrapper suitable to the particular product.

It is a particular object of the invention to provide a wrapper for brine-cured hams which has different properties in separate areas to conform to the difference in characteristics between the butt and the shank of a ham.

Various other and ancillary objects and advantages of the invention will become apparent from the following description and explanation. The invention is, therefore, herein described and illustrated with particular reference to hams without any intention to limit the invention to the illustrated forms nor to the described uses thereof. The preferred embodiment is, therefore, illustrated in the accompanying drawings in which:

Fig. 1 is a plan view of the wrapper in flat position with a ham thereon about to be wrapped.

Fig. 2 is an end view of the wrapping of Fig. 1.

Fig. 3 is a view of the assembly of Fig. 1 in the direction of the arrows 3 in Fig. 1.

Fig. 4 represents a wrapped ham more or less in outline.

Conventional hams of the present day are currently processed and wrapped with the idea of delivery to a consumer in about twelve days. The period may be longer or shorter and the wrapping may be altered to conform to some required period of time. In processing, it is now conventional to pump a brine curing salt under pressure into the main artery of the ham which is located in the butt end. In consequence, the butt is subject to leakage of juices from the ham including residual salt content. Also, the ham is greasy generally all over. To keep the grease and the aqueous juices within the wrapper, the wrapper is so composed that it has a suitable overall resistance to transmission of grease, a resistance around the butt of a wrapped ham to the transmission of grease, water vapor and aqueous juices, and a transmittancy of water vapor at the shank end.

Figs. 1 and 2 illustrate a multi-layer wrapping 10 in flat form ready for use, and in Fig. 1, the letter H represents a ham outline as it is positioned on the wrapping to be folded over the ham.

The wrapping comprises a first outer layer 12 of sheet material which is to provide the outer surface of the wrapped ham. It is of material which readily takes ink or other markings for advertising and labeling purposes. It is also of material which is suitably resistant to the transmission of grease, yet has transmittancy for water vapor to control shrinkage. Suitable materials are those which are cellulosic in character. Ordinary paper does not qualify but it may be made to qualify by special coatings. However, a homogeneous sheet is preferred to avoid the necessity of special coatings. One suitable material is a paper sheet made from highly hydrated cellulose pulp, which produces the conventional butcher's paper or so-called "grease-proof" paper. The degree of hydration predetermines the degree of resistance to transmission of grease, it being understood that the term "grease-proof" is a misnomer for "grease-resistant." Such butcher's paper is one which is finished on the forming machine, whereby the surface is not glassy and therefore is very receptive of printing ink. Such machine-finished paper of highly hydrated stock may be calendered to have a high degree of smoothness and an increased translucency verging on transparency, and the calendered sheets are known as glassine.

A second suitable material for the exterior sheet of the wrapping is vegetable parchment. It is homogeneous, is resistant to transmission of grease, and is transmissive of water vapor. It has a surface which is receptive of ink and the like for labeling.

The second outer sheet 13 of the flat wrapping is a sheet of ordinary paper or like material which is capable of absorbing and transmitting both grease and aqueous juices. It is of size to lie against the entire surface of the ham for taking up grease and especially exuded juices and thereby prevent the presence of a free liquid layer on the ham. Because of its absorbency, it is capable of transmitting aqueous juices sheetwise within itself to those areas of the wrapping from which it may evaporate and leave as water vapor.

The third sheet 14 of the wrapping is an important control sheet and by selection of it as to material and size, the loss of water vapor from the wrapping may be controlled for different environments, such as humidity, to which the wrapped ham may be subjected. The sheet 14 is arranged in the wrapping so that in folding the wrapping it forms the bottom and sides of a pocket in which is housed the butt of the ham. It is of size such that the pocket opens well below the shank and also well above the butt end. The exact location may be varied by changing the size of the sheet so that its edge 15 in Fig. 1 moves toward or away from the edges 16 and 17, respectively, of the first and second outer sheets 12 and 13. As shown, the sheet 14 is approximately one-half the area of the other sheets by reason of its edge 15 being in the vicinity of the center of said two sheets.

The sheet 14 is required to be resistant to the transmission of water vapor, and resistant to the transmission of grease and aqueous juices in the direction from the ham into the sheet. As a water-vapor barrier, it may be a perfect one, as when it is of certain plastics or is metal foil, preferably aluminum foil. It may also be an imperfect water-vapor barrier, yet be highly resistant to transmission of water vapor, as when it is the so-called "moisture-proof cellophane," preferably of the heat-sealing variety. It may be a sheet of glassine paper coated on one or both sides by a coating material having resistance to transmission of aqueous liquid and water vapor, for example, paraffin or other wax. The degree of resistance to transmission of water vapor may be controlled in one way with respect to coated cellophane or coated glassine or coated vegetable parchment by coating either only one face or both faces of the sheet. When but one face is so coated, it must be the one facing the ham. Otherwise, the moisture deriving from the ham through the sheet 12 will enter and swell the cellulosic sheet and cause loosening or breaking of the barrier coating on the side facing the exterior of the wrapped ham.

Although the three sheets may be unconnected and merely superimposed, it is in the interest of convenience and exactness that the wrapping be made as units. This may be done in various ways, preferably by securing the two outer sheets to each other on a line in the vicinity of one edge of the unit wrapping. With this structure, the third sheet may be merely held in place by friction without being secured. In the drawings of Fig. 1 and Fig. 2, all the sheets are shown as having different dimensions, with three edges of each substantially coincident. In both directions, the exterior sheet 12 is slightly larger than the sheet 13, and the sheet 14 is smaller than the sheet 13, having a slightly smaller dimension parallel to the edges 16 and 17 of the sheets 12 and 13, respectively, and a much shorter dimension at right angles to said edges. The dotted line 20 indicates a sealing line of adhesive, heat-sealing, or other connecting means, which might be stitching, holding the two outer sheets together. In the drawing, the third sheet is shown secured to the two outer sheets along the same line 20, but it is to be understood that this construction is optional. Being optional, the third sheet may be inserted into its position at any time, thus permitting selection of any desired control value for the third sheet, by selection of both size and material.

Fig. 3 shows a wrapping and a ham placed thereon. The dotted lines indicate only partially certain positions of the sheet when being folded over the ham H more particularly to illustrate how the butt of the ham is made to fall in the described pocket. The operation of folding is better explained in connection with Fig. 1. The dotted line 22 indicates generally the first line of folding whereby the adjacent corner of the assembly is brought up over the butt end 23 of the ham H. The two dotted lines 24 and 25 generally perpendicular to the line 22 illustrate the two succeeding folds. Following said three folds, the ham is enclosed deep in a generally tubular wrapping the top of which is suitably folded down over the shank 26 to conform to the shape of the ham which may appear as shown in Fig. 4 with a string 27 tied about the wrapping.

When hams are unwrapped, there is loss in weight by shrinkage resulting from the evaporation of water. Also, this overall exposure to air is effective to induce the conditions leading to rancidification. When hams are placed in ordinary paper, the paper wicks free water from the ham and facilitates evaporation of water from the paper. This causes the paper to continue its wicking action and thus increases the shrinkage with resulting greater alteration in the taste qualities of the ham. Complete sealing by wrappings which prevent loss of water vapor prevent breathing and result in the slime above referred to.

By the present invention, access to the ham by air is limited, escape of gas from the ham is permitted, and evaporation of water is limited and controlled so as to avoid slime and yet have a low degree of shrinkage. This results in substantial preservation of the taste quality of the ham as wrapped. The sheet material against the ham at the area lining the pocket for the butt may be constantly wet with aqueous juices. This prevents the existence of a layer of slime and the wet condition of the sheet prevents the wicking of more juices from the ham. A slight degree of wicking may occur slowly to the extent that the soaked condition may be lessened by the crawling of aqueous solution to or above the top of the pocket for evaporation, or by vapor transmission at the area of the pocket sides.

The preferred structure for the wrapping is an exterior sheet of what has been described above as butcher's paper, a second outer sheet of ordinary paper to lie adjacent the ham and a third sheet of glassine paper coated on both faces with paraffin wax. With such a structure, it has been found that under ordinary conditions of display for sale the exterior sheet of the wrapped ham remains dry, thus permitting the application at any time of labels or tape having pressure sensitive adhesive, which may bear useful indicia or advertising, thus facilitating the final wrapping step and avoiding the necessity of applying a string as indicated in the drawing.

It is to be understood that the preferred embodiment above referred to is subject to numerous modifications in addition to those described above. Therefore, such changes and modifications are contemplated as falling within the scope of the invention as set forth in the appended claims.

I claim:

1. A wrapped ham comprising a brine-cured ham subject to loss of juices therefrom, and a two-layer wrapping completely enclosing the ham, the butt of the ham being housed in a pocket formed by initially folding the wrapping over the butt in all directions from the butt toward the shank, the inner layer in contact with the ham being a sheet of paper absorptive of said juices and of grease, the outer layer being a sheet of cellulosic material transmissive of water vapor and resistant to the transmission of grease, and between said two layers in the pocket-forming portion of the wrapping a third sheet of material resistant to transmission of water vapor and resistant to the transmission of grease and said juices in the direction from the ham into the sheet, said third sheet forming a pocket for the butt of the ham and having its edges in the folded form inwardly from the end of the shank of the ham, whereby grease and aqueous solution from the ham do not penetrate through the wrapping around the pocketed butt, whereby aqueous juices leaking from the ham to the inner sheet in the pocket may move only laterally within the inner sheet around the pocketed butt, and whereby water vapor may readily escape from the wrapped ham only at the open end of the pocket and through the exterior sheet and the folds of the wrapping.

2. A wrapped ham comprising a brine-cured ham subject to loss of juices therefrom, and a two-layer wrapping completely enclosing the ham, the butt of the ham being housed in a pocket formed by initially folding the wrapping over the butt in all directions from the butt toward the shank, the inner layer in contact with the ham being a sheet of paper absorptive of said juices, grease and water vapor, the outer layer being a sheet of cellulosic material transmissive of water vapor, and between said two layers in the pocket-forming portion of the wrapping a third sheet of material resistant to transmission of water vapor and resistant to the transmission of grease and said juices in the direction from the ham into the sheet, said third sheet forming a pocket for the butt of the ham and having its edges in the folded form inwardly from the end of the shank of the ham, whereby grease and aqueous solution from the ham do not penetrate through the wrapping around the pocketed butt, whereby aqueous juices leaking from the ham to the inner sheet in the pocket may move only laterally within the inner sheet around the pocketed butt, and whereby water vapor may readily escape from the wrapped ham only at the open end of the pocket and through the exterior sheet and the folds of the wrapping.

3. A wrapped ham comprising a ham, and a two-layer wrapping completely enclosing the ham, the butt of the ham being housed in a pocket formed by initially folding the wrapping over the butt in all directions from the butt toward the shank, the inner layer in contact with the ham being a sheet of paper absorptive of water vapor and of grease, the outer layer being a sheet of cellulosic material transmissive of water vapor and resistant to the transmission of grease, and between said two layers in the pocket-forming portion of the wrapping a third sheet of material resistant to transmission of water vapor and resistant to the transmission of grease in the direction from the ham into the sheet, said third sheet forming a pocket for the butt of the ham and having its edges in the folded form inwardly from the end of the shank of the ham, whereby grease from the ham does not penetrate through the wrapping around the pocketed butt, and whereby water vapor may readily escape from the wrapped ham only at the open end of the pocket and through the exterior sheet and the folds of the wrapping.

4. A wrapped ham comprising a ham, and a two-layer wrapping completely enclosing the ham, the butt of the ham being housed in a pocket formed by initially folding the wrapping over the butt in all directions from the butt toward the shank, the inner layer in contact with the ham being a sheet of paper absorptive of grease and water vapor, the outer layer being a sheet of cellulosic material transmissive of water vapor, and between said two layers in the pocket-forming portion of the wrapping a third sheet of material resistant to transmission of water vapor and resistant to the transmission of grease in the direction from the ham into the sheet, said third sheet forming a pocket for the butt of the ham and having its edges in the folded form inwardly from the end of the shank of the ham, whereby grease from the ham does not penetrate through the wrapping around the pocketed butt, and whereby water vapor may readily escape from the wrapped ham only at the open end of the pocket and through the exterior sheet and the folds of the wrapping.

5. A wrapping for brine-cured hams comprising three superimposed sheets of material, the first outer sheet being a sheet of cellulosic material transmissive of water vapor and resistant to the transmission of grease, said sheet being adapted for the exterior of a wrapped ham and for the receipt of printing matter thereon, the second outer sheet being a paper absorptive of and permeable to grease from a ham and to aqueous juices from a ham, the two outer sheets being sufficiently large to wrap a ham completely with folds in positional relation to said ham to form a pocket over the butt of a ham, and the third sheet being of material resistant to transmission of water vapor and impervious on the ham-side to grease and to said juices and of smaller size than said other sheets, said third sheet being located in the area of the flat wrapping so as to form the bottom and sides of said pocket about the butt of a ham, the size of the third sheet being limited so as to expose the shank within the two outside sheets and beyond the edges of the third sheet when said wrapping encloses said ham and forms said pocket about the butt thereof.

6. A wrapping according to claim 5 in which the third sheet is a cellulosic sheet resistant to the transmission of grease with a water-vapor barrier coating at least on the face adjacent the second outer sheet.

7. A wrapping according to claim 6 in which the cellulosic sheet is glassine.

8. A wrapping according to claim 6 in which the cellulosic sheet is vegetable parchment.

9. A wrapping according to claim 5 in which the third sheet is a cellulosic sheet resistant to the transmission of grease with a water-vapor barrier coating on both faces thereof.

10. A wrapping according to claim 9 in which the cellulosic sheet is glassine.

11. A wrapping according to claim 9 in which the cellulosic sheet is vegetable parchment.

12. A wrapping according to claim 5 in which the two outer sheets are secured together adjacent one edge of each.

13. A wrapping according to claim 12 in which the two sheets are secured over a line inwardly from said edges.

14. A wrapping according to claim 5 in which the third sheet is metal foil.

15. A wrapping according to claim 5 in which the first outer sheet is a highly hydrated paper sheet resistant to the transmission of grease.

16. A wrapping according to claim 5 in which the first outer sheet is vegetable parchment.

17. A wrapping for meats having an area thereof comprising three superimposed sheets, one outer sheet being a sheet of cellulosic material transmissive of water vapor and resistant to the transmission of grease, the second outer sheet being of material absorptive of grease and aqueous solutions, and the third sheet facing said second outer sheet, said third sheet being of material resistant to transmission of water vapor and impervious on its face toward the second outer sheet to grease and to said aqueous solutions, said wrapping being rectangular, said three sheets having three edges of each substanitally coincident, the two outer sheets having their fourth edges substantially coincident, and the third sheet having its remaining edge located intermediate the fourth edges of the outside sheets and their opposite edges and in the vicinity of the line midway between said fourth and opposite edges, the size of the outer sheets being such as to permit wrapping a ham completely with the assembly of sheets, with said third sheet folded to provide a pocket housing only the butt end of the ham.

18. A wrapping for meats comprising three superimposed sheets, the first outer sheet being resistant to the transmission of grease and transmissive of water vapor, the second outer sheet being absorbent of grease and of aqueous liquid, and the third sheet being resistant on its face toward the second outer sheet to the transmission of grease, water vapor and aqueous liquid, said third sheet being smaller than each of said outer sheets whereby the wrapping as a flat assembly has a first end area highly transmissive of water vapor and a second end area highly resistant to transmission of water vapor and of grease, and whereby both areas are resistant to the transmission of grease, the said end areas meeting at a region permitting one portion of the wrapped meat to lie in a pocket formed by the second end area and the remaining portion to project from said pocket.

19. A wrapping for brine-cured hams comprising three superimposed sheets of material, the first outer sheet being a sheet of cellulosic material transmissive of water vapor, said sheet being adapted for the exterior of a wrapped ham and for the receipt of printing matter thereon, the second outer sheet being a paper absorptive of aqueous juices from the ham, the two outer sheets being sufficiently large to wrap a ham completely with folds forming a pocket over the butt of the ham, and the third sheet being of material resistant to transmission of water vapor and impervious on the ham-side to grease and to said juices and of smaller size than said other sheets, said third sheet being located in the area of the flat wrapping so as to form the bottom and sides of said pocket about the butt of the ham, the size of the third sheet being limited to expose the shank of the ham within the two outside sheets and beyond the edges of the third sheet.

20. A wrapping for meats having an area thereof comprising three superimposed sheets, one outer sheet being a sheet of cellulosic material transmissive of water vapor, the second outer sheet being of material absorptive of aqueous solutions, and the third sheet facing said second outer sheet, said third sheet being of material resistant to transmission of water vapor and impervious on its face toward the second outer sheet to grease and to said aqueous solutions, said third sheet having an area approximately half the area of each of the outer sheets, and being located so as to form an open-ended pocket in an article wrapped with said wrapping.

21. A wrapping for meats comprising three superimposed sheets, the first outer sheet being transmissive of water vapor, the second outer sheet being absorbent of aqueous liquid, and the third sheet being resistant on its face toward the second outer sheet to the transmission of grease, water vapor and aqueous liquid, said third sheet being smaller than each of said outer sheets whereby the wrapping as a flat assembly has a first end area highly transmissive of water vapor and a second end area highly resistant to transmission of water vapor and of grease, the said end areas meeting at a region permitting one portion of the wrapped meat to lie in a pocket formed by the second end area and the remaining portion to project from said pocket.

References Cited in the file of this patent

UNITED STATES PATENTS

| | | |
|---|---|---|
| 1,168,254 | Frisch et al. | Jan. 11, 1916 |
| 1,924,903 | Birdseye | Aug. 29, 1933 |
| 2,115,318 | Rosen | Apr. 26, 1938 |
| 2,518,762 | Draheim | Aug. 15, 1950 |
| 2,632,723 | Bennett | Mar. 24, 1953 |